Aug. 27, 1935.　　　　F. C. FRANK　　　　2,012,662

BRAKE COOLING MEANS

Filed June 29, 1932

INVENTOR.
FREDERICK C. FRANK
BY
ATTORNEY

Patented Aug. 27, 1935

2,012,662

UNITED STATES PATENT OFFICE 2,012,662

BRAKE COOLING MEANS

Frederick C. Frank, South Bend, Ind., assignor to Bendix Aviation Corporation, South Bend, Ind., a corporation of Delaware Application June 29, 1932, Serial No. 620,010

4 Claims. (Cl. 188—264)

This invention relates to brakes and more particularly to internal expanding brakes.

Broadly, the invention comprehends a brake structure including a fixed support, a rotatable drum associated therewith and a friction element on the support for co-operation with the drum. As shown, the friction element comprises a split band having one end suitably anchored on the support and its other end connected as by a link to an operating shaft.

In brake structures of this type, excessive heat is generated due to friction between the friction element and the braking surface of the drum. Various means have been employed to overcome this objectionable feature, some of which include heat radiating fins arranged on the outer surface of the drum, and others have means for directing air currents over and around the drum and friction elements. None of these structures have proved entirely satisfactory.

The present invention aims to overcome these objections, and to that end certain means are employed for cooling the friction element per se.

An object of the invention is to provide means for cooling the friction element of a brake.

Another object of the invention is to provide means for cooling the friction element of a brake including means for circulating water or another cooling fluid over the back of the friction element.

Another object of the invention is to provide means for cooling the friction element of a brake including a chamber on the back of the element and means connecting the chamber to a condenser.

A further object of the invention is to provide means for cooling the friction element of a brake including means for circulating water or another cooling fluid over the back of the brake and means for condensing the cooling fluid.

A feature of the invention is a friction element having a chamber on the back thereof and a condenser connected to the chamber.

Another feature of the invention is a friction element comprising a split band having a friction lining on its face and a chamber on its back, the respective ends of the chamber being connected to a condenser.

Other objects and features of the invention will appear from the following description taken in connection with the drawing which forms a part of this specification, and in which.

Figure 1:
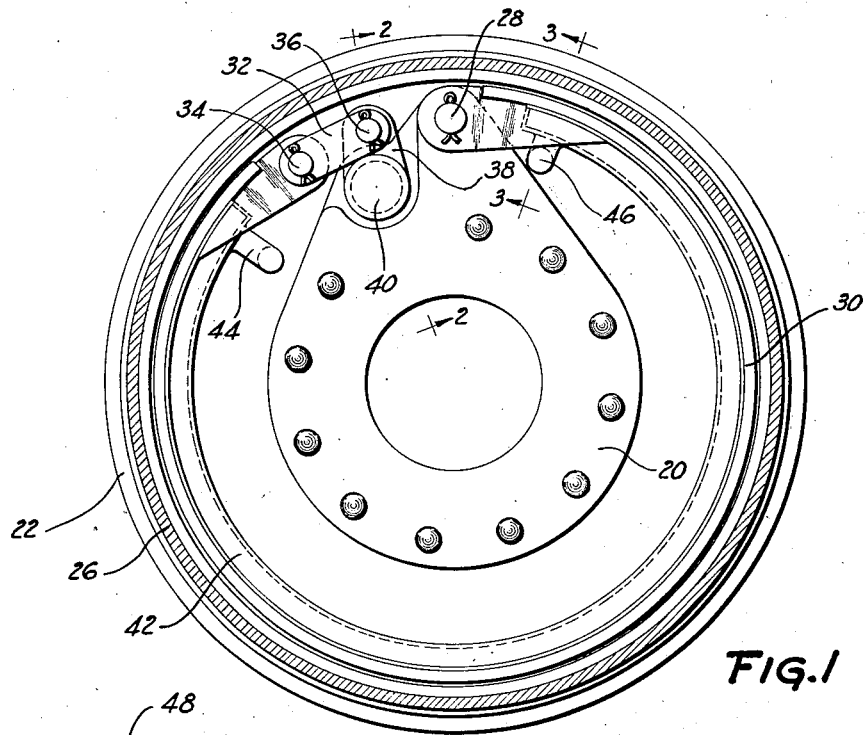
Figure 1 is a vertical sectional view of a brake structure taken just back of the head of the drum illustrating the invention as applied.
Figures 2, 3:
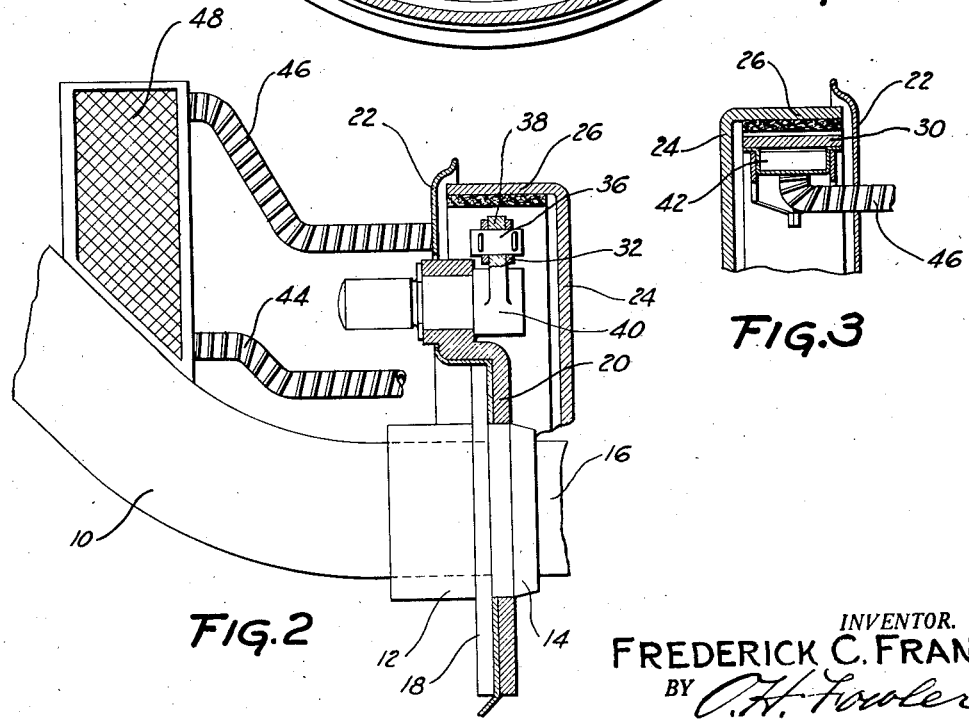
Figure 2 is a vertical sectional view substantially on line 2—2, Figure 1.
Figure 3 is a sectional view substantially on line 3—3, Figure 1.

Referring to the drawing for more specific details of the invention, 10 represents an axle tubing having secured thereto a sleeve 12. This sleeve provides a shoulder 14 for a spindle 16 which may be a continuation of the axle tubing. The sleeve 14 has formed thereon a circumferential flange 18 adapted to support a torque taking plate 20 and a backing plate 22.

The spindle 16 has positioned thereon for rotation the conventional wheel, not shown, and secured to the wheel for rotation therewith is the conventional drum 24 having a braking flange 26. The torque taking plate 20 has pivoted thereto as by a pin 28 one end of a split band 30, the other end of which is pivoted to one end of a link 32 as by a pin 34. The other end of the link is secured as by a pivot pin 36 to the free end of an arm 38 formed on an operating shaft 40 positioned for rotation in the torque taking plate 20. The band is adaptable for co-operation with the braking surface of the drum which is provided with a suitable lining.

The structure thus far described is a conventional brake of the split band type and accordingly needs no further explanation. Brakes of this structure become overheated by reason of friction setup between the friction element and the braking surface of the drum, and to overcome this objectionable feature the friction element has formed on the back thereof a chamber 42. The wall of this chamber is preferably formed of a flexible material which will readily yield upon the application and release of the friction element with the braking surface of the drum without injury thereto. As shown, the chamber 42 extends from substantially one end of the friction element to the other, so as to provide the maximum cooling surface. The chamber 42 has leading from its respective ends flexible pipe sections 44 and 46. These pipe sections communicate with a condenser 48 shown positioned on the axle tubing 10, it of course being understood that the condensers may be arranged on any suitable fixed support.

In operation upon application of the brake in instances where the friction element generates excessive heat due to its engagement with the braking surface of the drum, the cooling fluid in the chamber is heated to such an extent that it vaporizes and in such instances the vapor passes off through the tube 46 into the condenser 48 where it becomes condensed and is returned to the chamber 42 through the tube 44, it of course being understood that the tubes 44 and 46 are sufficiently flexible that the slight movement of the friction element upon application of the brakes and release of the brake will in no way affect these connections.

It will also be understood that as the cooling fluid circulates from the condenser 48 through the chamber 42 where it is vaporized and returns to the condenser through the tube 46, it will be constantly kept in circulation and will effectively cool the friction element. The connections between the radiator and brake shoe cooling chamber are preferably arranged such that the anchor end of the shoe and the upper end of the cooling chamber is near the top, since this point of the brake shoe is generally the hottest and such an arrangement aids in the thermo-siphon circulation of the liquid.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A brake comprising a friction element anchored at one end and actuated at the other, a chamber arranged on the back of the friction element, a condenser, and flexible tubular connections between the condenser and the respective ends of the chamber, the uppermost end of the chamber being adjacent the anchored shoe end.

2. A brake comprising an anchor, a friction element engaging said anchor at one end and having a chamber arranged on the back thereof, a condenser, and flexible tubular members connecting the respective ends of the condenser to the respective ends of the chamber, the said chamber having one end and its uppermost point located at the anchor engaging end of the friction element.

3. A brake comprising a friction element anchored at one end, a chamber arranged on the back of the friction element, a condenser, and tubular members connecting the condenser to the respective ends of the chamber, said tubular members connected to points in the chamber adjacent the hottest and coldest points of the friction element during braking, said points being the anchor and free ends of the shoe respectively.

4. In a brake mechanism an axle, a brake anchor and actuating plate secured to said axle, a brake shoe anchored at one end to said plate and adapted to be actuated at its other end by means carried by said plate, a brake drum rotatable about said axle, a cooling chamber extending along the back side of the brake shoe, a radiator supported on said axle and spaced from the brake, and flexible pipe connections connecting the anchor end of said brake shoe chamber with the top of said radiator and the free end of said shoe chamber with the bottom of said radiator respectively.

FREDERICK C. FRANK.